United States Patent
Iwasaki et al.

(10) Patent No.: US 9,984,793 B2
(45) Date of Patent: May 29, 2018

(54) NON-HALOGEN MULTILAYER INSULATING WIRE

(71) Applicant: Hitachi Metals, Ltd., Minato-ku, Tokyo (JP)

(72) Inventors: Makoto Iwasaki, Hitachi (JP); Kohei Arita, Hitachi (JP); Hiroshi Okikawa, Hitachi (JP); Mitsuru Hashimoto, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days. days.

(21) Appl. No.: 15/281,180

(22) Filed: Sep. 30, 2016

(65) Prior Publication Data
US 2017/0098492 A1    Apr. 6, 2017

(30) Foreign Application Priority Data
Oct. 2, 2015 (JP) .................................. 2015-196738

(51) Int. Cl.
*H01B 7/00* (2006.01)
*H01B 7/18* (2006.01)
(Continued)

(52) U.S. Cl.
CPC .............. *H01B 7/183* (2013.01); *C08K 3/22* (2013.01); *C09D 123/22* (2013.01);
(Continued)

(58) Field of Classification Search
CPC .............. C08K 3/22; C08K 2003/2224; C09D 123/22; C09D 167/02; C09D 179/08;
(Continued)

(56) References Cited

U.S. PATENT DOCUMENTS

2007/0262483 A1* 11/2007 Grasselli ............... B29C 44/322
                                                        264/172.19
2008/0105454 A1*  5/2008 Morioka ................ H01B 3/441
                                                        174/120 SR
(Continued)

FOREIGN PATENT DOCUMENTS

| EP | 1 655 741 A1 | 5/2006 | |
| JP | 2012109229 A * | 6/2012 | ............ H01B 7/295 |
| JP | 2013-214487 A | 10/2013 | |

OTHER PUBLICATIONS

Extended European Search Report issued in counterpart European Application No. 16191464.3 dated Feb. 13, 2017 (eight pages).

*Primary Examiner* — Timothy Thompson
*Assistant Examiner* — Guillermo Egoavil
(74) *Attorney, Agent, or Firm* — Crowell & Moring LLP

(57) ABSTRACT

A non-halogen insulating wire with excellent flame resistance as well as high mechanical characteristics (wear resistance) and electrical insulation characteristics is provided. A non-halogen two-layer insulating wire includes: a conductor; and an insulating layer having an insulating inner layer which covers an outer circumference of the conductor and an insulating outer layer which covers an outer circumference of the insulating inner layer. The insulating inner layer is made of a first non-halogen resin composition which contains metal hydroxide and a base polymer (A) including polyolefin, and has a thickness of 20% to 58% of an entire thickness of the insulating layer. The insulating outer layer is made of a second non-halogen resin composition which contains metal hydroxide and a base polymer (B) including polyester resin and/or polyester elastomer resin.

18 Claims, 1 Drawing Sheet

(51) Int. Cl.
- *H01B 3/42* (2006.01)
- *H01B 3/44* (2006.01)
- *H01B 7/295* (2006.01)
- *C08K 3/22* (2006.01)
- *C09D 123/22* (2006.01)
- *C09D 167/02* (2006.01)
- *C09D 179/08* (2006.01)
- *H01B 7/02* (2006.01)
- *H01B 3/28* (2006.01)

(52) U.S. Cl.
CPC ......... *C09D 167/02* (2013.01); *C09D 179/08* (2013.01); *H01B 3/28* (2013.01); *H01B 3/421* (2013.01); *H01B 3/427* (2013.01); *H01B 3/441* (2013.01); *H01B 3/442* (2013.01); *H01B 7/0216* (2013.01); *H01B 7/295* (2013.01); *C08K 2003/2224* (2013.01)

(58) Field of Classification Search
CPC .......... H01B 3/28; H01B 3/421; H01B 3/427; H01B 3/441; H01B 3/442; H01B 7/183; H01B 7/0216; H01B 7/292; H01B 7/295

USPC .......................... 174/110 R, 120 R; 427/118
See application file for complete search history.

(56) References Cited

U.S. PATENT DOCUMENTS

| | | | |
|---|---|---|---|
| 2010/0307822 A1* | 12/2010 | Schmidt ................ | H01B 3/442 174/74 R |
| 2013/0228358 A1 | 9/2013 | Fujimoto et al. | |
| 2013/0312998 A1* | 11/2013 | Mayama ................ | H01B 7/295 174/110 SR |
| 2014/0011028 A1 | 1/2014 | Iwasaki et al. | |
| 2014/0138118 A1* | 5/2014 | Fujimoto ............... | H01B 3/421 174/120 SR |
| 2014/0141240 A1* | 5/2014 | Segawa ................... | H01B 3/30 428/375 |
| 2015/0060107 A1 | 3/2015 | Iwasaki et al. | |

\* cited by examiner

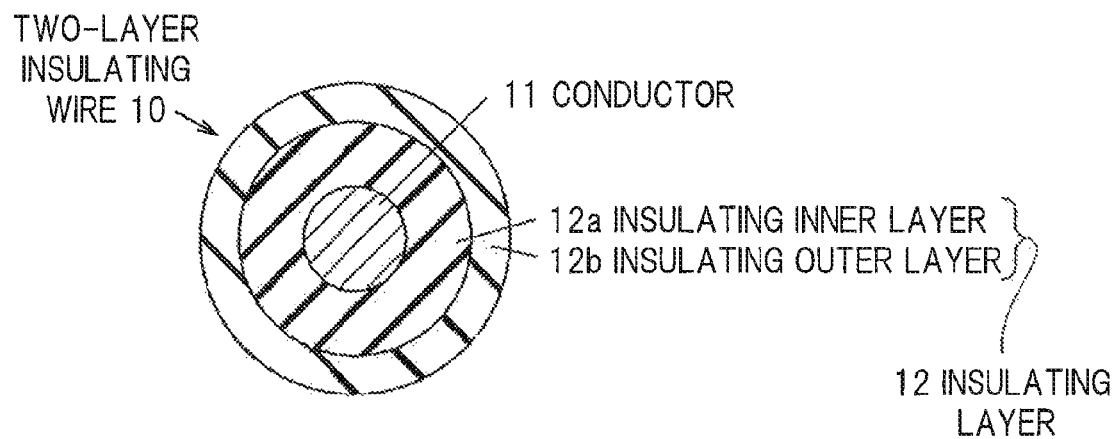

NON-HALOGEN MULTILAYER INSULATING WIRE

CROSS-REFERENCE TO RELATED APPLICATION

The present application claims priority from Japanese Patent Application No. 2015-196738 filed on Oct. 2, 2015, the content of which is hereby incorporated by reference into this application.

TECHNICAL FIELD OF THE INVENTION

The present invention relates to a non-halogen multilayer insulating wire.

BACKGROUND OF THE INVENTION

High wear resistance, low temperature property, flame resistance, and others are demanded for wires and cables applied to railway vehicle, automobile, and equipment, etc., as needed.

It has been known that a polymer with high crystallinity (such as HDPE) is basically used in order to obtain high wear resistance. However, since the polymer has low filler receptivity, a halogen-based flame retardant or a phosphorus-based flame retardant such as red phosphorus, which has the effect for the flame resistance with a small amount of addition, has to be used.

However, since the halogen-based flame retardant generates halogen gas at the time of combustion, there is a lack of consideration for environmental problems that has been increasingly demanded worldwide. Moreover, the phosphorous-based flame retardant such as red phosphorous also has problems of generating phosphine at the time of combustion and generating phosphate at the time of disposal to pollute underground water vein.

Thus, a non-halogen insulating wire using a metal hydroxide as a flame retardant have been developed (see, for example, Japanese Patent Application Laid-open Publication No. 2013-214487 (Patent Document 1).

SUMMARY OF THE INVENTION

The metal hydroxide does not cause the problems as described above as compared with the halogen-based flame retardant and the phosphorous-based flame retardant. However, the metal hydroxide is normally required to be highly filled, and therefore, has problems of degrading mechanical characteristics and electrical insulation characteristics.

Thus, an object of the present invention is to provide a non-halogen insulating wire with excellent flame resistance as well as high mechanical characteristics (wear resistance) and electrical insulation characteristics.

In order to achieve the above-described object, the following non-halogen insulating wire is provided according to the present invention.

[1] A non-halogen multilayer insulating wire has a feature including: a conductor; and an insulating layer having an insulating inner layer which covers an outer circumference of the conductor and an insulating outer layer which covers an outer circumference of the insulating inner layer, a feature in which the insulating inner layer is formed of a first non-halogen resin composition containing a metal hydroxide and a base polymer (A) including polyolefin, and the insulating inner layer has a thickness of 20% to 58% of an entire thickness of the insulating layer, and a feature in which the insulating outer layer is formed of a second non-halogen resin composition containing a metal hydroxide and a base polymer (B) including a polyester resin and/or polyester elastomer resin.

[2] The non-halogen multilayer insulating wire described above in [1], has a feature in which the polyester resin is a polybutylene terephthalate (PBT) and/or polybutylene naphthalate (PBN).

[3] The non-halogen multilayer insulating wire described above in [1] or [2], has a feature in which the polyester elastomer resin is a polybutylene elastomer.

[4] The non-halogen multilayer insulating wire described above in any one of [1] to [3], has a feature in which the base polymer (B) contains a resin having an aromatic structure in a main chain.

[5] The non-halogen multilayer insulating wire described above in [4], has a feature in which the resin having the aromatic-structure in the main chain is one or more selected from polyether imide, silicone modified polyether imide, polyphenylene ether, modified polyphenylene ether, and polyether ether ketone.

[6] The non-halogen multilayer insulating wire described above in [4], has a feature in which the resin having the aromatic structure in the main chain is polyether imide and/or silicone modified polyether imide.

[7] The non-halogen multilayer insulating wire described above in any one of [1] to [6], has a feature in which the second non-halogen resin composition has a thermogravimetric mass loss (TG) of −60% or more when heated from 40° C. to reach 430° C. at a temperature increase rate of 10° C./min under purge gas of dried air in a thermogravimetric analysis method.

[8] The non-halogen multilayer insulating wire described above in any one of [8] to [7], has a feature in which the first non-halogen resin composition contains 20 to 100 parts by mass of the metal hydroxide with respect to 100 parts by mass of the base polymer (A).

[9] The non-halogen multilayer insulating wire described above in any one of [1] to [8], has a feature in which the second non-halogen resin composition contains 5 to 50 parts by mass of the metal hydroxide with respect to 100 parts by mass of the base polymer (B).

[10] The non-halogen multilayer insulating wire described above in any one of [1] to [9], has a feature in which the metal hydroxide contained in the first and/or second non-halogen resin composition is a magnesium hydroxide.

According to the present invention, a non-halogen insulating wire with excellent flame resistance as well as high mechanical characteristics (wear resistance) and electrical insulation characteristics is provided.

BRIEF DESCRIPTIONS OF THE DRAWINGS

FIG. 1 is a cross-sectional view illustrating an embodiment of a non-halogen multilayer insulating wire of the present invention.

DESCRIPTIONS OF THE PREFERRED EMBODIMENT

FIG. 1 is a cross-sectional view illustrating an example of a non-halogen two-layer insulating wire, which is an embodiment of the non-halogen multilayer insulating wire of the present invention.

A non-halogen two-layer insulating wire 10 according to the present invention illustrated in FIG. 1 includes a conductor 11 made of a general-purpose material such as tin-plated copper, and an insulating layer 12 having an insulating inner layer 12a which covers the outer circumference of the conductor 11 and an insulating outer layer 12b which covers the outer circumference of the insulating inner layer 12a.

In the non-halogen two-layer insulating wire 10, the insulating inner layer 12a is made of a first non-halogen resin composition which contains a metal hydroxide and a base polymer (A) including polyolefin, and has a thickness of 20% to 58% of an entire thickness of the insulating layer 12.

Also, in the non-halogen two-layer insulating wire 10, the insulating outer layer 12b is made of a second non-halogen resin composition which contains a metal hydroxide and a base polymer (B) including polyester resin and/or polyester elastomer resin.

[First Non-Halogen Resin Composition that Forms Insulating Inner Layer]

The base polymer (A) for use in the first non-halogen resin composition is not particularly limited as long as it is polyolefin not including halogen. Specifically, high-density polyethylene, medium-density polyethylene, low-density polyethylene, very low-density polyethylene, linear low-density polyethylene, ethylene-acrylic acid ester copolymer, and copolymer of α-olefin and ethylene are cited. The α-olefin may be in a liner or branch form. As the α-olefin, for example, propylene, 1-butene, 1-pentene, 1-hexene, 4-methyl pentene, 1-heptene, 1-octene, and others are cited. Single use may be applied to these materials, or two or more of these materials may be used together. Also, in order to obtain the more enhanced electrical characteristics, polyolefin modified by the grafting, the copolymerization, or others using maleic anhydride or others may be applied.

To the first non-halogen resin composition, metal hydroxide is added in order to provide the flame resistance. As the metal hydroxide, magnesium hydroxide, aluminum hydroxide, calcium hydroxide, and others are cited. Single use of these materials may be applied, or two or more of these materials may be used together. Particularly, the magnesium hydroxide is preferable because of its high dehydration temperature and high flame resistance. The metal hydroxide may be subjected to surface treatment.

As an addition amount of the metal hydroxide, it is preferred to contain 20 to 100 parts by mass with respect to 100 parts by mass of the base polymer (A) for easily achieving both of the enhanced flame resistance and electrical characteristics. If the addition amount is smaller than 20 parts by mass, there is a risk that does not cause the flame resistance. If the addition amount exceeds 100 parts by mass, there is a risk that does not cause the favorable electrical characteristics. An upper-limit value of the addition amount of the metal hydroxide is preferably 90 parts by mass, more preferably 85 parts by mass, and most preferably 80 parts by mass, with respect to 100 parts by mass of the base polymer (A). A lower-limit value of the addition amount of the metal hydroxide is preferably 25 parts by mass and more preferably 30 parts by mass, with respect to 100 parts by mass of the base polymer (A).

Also, as required, another non-halogen flame retardant may be used together. Specifically, clay, silica, zinc stannate, zinc borate, calcium borate, dolomite hydroxide, and silicone are cited. A phosphorous-based flame retardant such as red phosphorous and a triazine-based flame retardant such as melamine cyanurate generate phosphine gas or cyanide gas, respectively, which are toxic to humans, and therefore, are inappropriate.

[Second Non-Halogen Resin Composition that Forms Insulating Outer Layer]

The base polymer (B) for use in the second non-halogen resin composition is a polyester resin and/or a polyester elastomer resin not including halogen. Particularly, as the polyester resin, it is preferred to include polybutylene terephthalate (PBT) and/or polybutylene naphthalate (PBN). These materials are excellent in mechanical strength and have relatively low melting points, and therefore, are preferable because of being easily shaped. In a case of usage for providing flexibility, a polyester elastomer resin may be applied. As the polyester elastomer resin, for example, a polyester block copolymer is cited, the polyester block copolymer having a hard segment taking an aromatic polyester unit made of a glycol component and an acid component such as polybutylene terephthalate (PBT), polybutylene naphthalate (PBN), or polyethylene terephthalate (PET) and having a soft segment taking polyether such as poly tetra methylene glycol and an aliphatic polyester such as poly tetra methylene adipate or ε-caprolactone.

To the base polymer (B), not only the polyester resin or the polyester elastomer resin but also a resin having an aromatic structure in a main chain (hereinafter, referred to as an aromatic resin) may be added. The aromatic resin can easily generate a carbonized layer at the time of combustion, and therefore, can provide the high flame resistance. Particularly, polyether imide, silicone modified polyether imide, polyphenylene ether, modified polyphenylene ether, and polyether ether ketone can easily exert, the effects. Also, in consideration of formability and versatility, polyether imide and silicone modified polyether imide are preferable. Single use of these materials may be applied, or two or more of these materials may be used together. A blend ratio of these materials is not particularly limited as long as the carbonized layer is generated and the high flame resistance is obtained. For example, a relation of "(a total amount of the polyester resin and the polyester elastomer resin):(the aromatic resin) =4:6 to 6:4" is preferable.

The second non-halogen resin composition may have a thermogravimetric mass loss (TG) of −60% or more when heated from 40° C. to reach 430° C. at a temperature increase rate of 10° C./rain under purge gas of dried air in a thermogravimetric analysis method. When an organic material is heated to a temperature near 430° C. in the thermogravimetric analysis method, its TG is occupied mostly by combustible gas. Since the combustion advances when the amount of the combustible gas is large, the material having the less decrease in weight is excellent in the flame resistance. Also, when a carbonized layer is formed at the time of combustion, a heat insulation effect is exerted, so that this manner is effective for the flame resistance. When a carbonized layer is formed, a change in weight is decreased, and the amount of the combustible gas is also decreased. Therefore, the high flame resistance can be achieved.

To the second non-halogen resin composition, metal hydroxide is added in order to provide the flame resistance. As the metal hydroxide, magnesium hydroxide, aluminum hydroxide, calcium hydroxide, and others are cited. And, single use of these materials may be applied, or two or more of these materials may be used together. Particularly, the magnesium hydroxide is preferable because of its high dehydration temperature and high flame resistance. The metal hydroxide may be subjected to surface treatment.

As an additional amount of the metal hydroxide, it is preferable to contain 5 to 50 parts by mass with respect to 100 parts by mass of the base polymer (B) for achieving both of the flame resistance and the favorable electrical characteristics. If the addition amount is smaller than 5 parts by mass, there is a risk that does not cause the flame resistance. If the addition amount exceeds 50 parts by mass, there is a risk that does not cause the favorable electrical characteristics.

As required, a cross-linker, a cross-linking promoter, a flame retardant promoter, an ultraviolet absorber, a light stabilizer, a softener, a lubricant, a coloring agent, a reinforcing agent, a surface-active agent, an inorganic filler, a plasticizer, a metal chelator, a blowing agent, a compatibilizing agent, a processing aid, a stabilizer, or others can be added to the first and/or second non-halogen resin composition.

[Insulating Layer]

While the insulating layer 12 according to the embodiment of the present invention illustrated in FIG. 1 is configured of two layers, the insulating layer 12 may have a structure in which a plurality of insulating inner layers 12a are provided immediately above the conductor 11, or may have a multilayer structure in which a plurality of insulating outer layers 12b are provided on the insulating inner layer 12a.

Also, as long as the insulating inner layer 12a is provided immediately above the conductor and the insulating outer layer 12b is provided in the outermost layer, there is no problem in presence of a different resin composition layer between them.

The insulating inner layer 12a is required to have a thickness of 20% to 58% of an entire thickness of the insulating layer 12. If the thickness is smaller than 20%, the sufficient electrical characteristics cannot be obtained. If the thickness exceeds 58%, the wear resistance cannot be ensured. The thickness of the insulating inner layer 12a is preferably 25% or more of the entire thickness of the insulating layer 12, more preferably 30% or more thereof, and still more preferably 35% or more thereof. Also, the thickness of the insulating inner layer 12a is preferably 55% or less of the entire thickness of the insulating layer 12, more preferably 50% or less thereof, and still more preferably 45% or less thereof. Note that the entire thickness of the insulating layer 12 described here means a thickness of the entire insulating layer including, if any, an insulating layer other than the insulating inner layer 12a and the insulating outer layer 12b.

The insulating layer 12 can be provided by, for example, two-layer coextrusion molding, and is subjected to a cross-linking treatment after the molding.

Although the insulating layer 12 is not required to be subjected to a cross-linking treatment, it is preferable to perform the cross-linking treatment in a specification which requires the heat resistance. A chemical cross-linking treatment using organic peroxide, sulfur compound, silane, or others, a radiation cross-linking treatment using electron ray, radioactive ray, or others, and a cross-linking treatment using other chemical reactions, and others are cited as the cross-linking treatment. And, any cross-linking treatment is applicable.

The two-layer insulating wire 10 may include a braided wire or others as required.

EXAMPLES

In the following, the present invention is further specifically described with reference to examples. Note that the present invention is not limited at all by the following examples.

Examples and Comparative Examples

The two-layer insulating wire 10 illustrated in FIG. 1 was produced as follows.

(1) As the conductor 11, a composition of 37 tin plated conductors per 0.18 mm was used.

(2) A resin composition obtained by kneading each composition in examples and comparative examples shown in Table 1 by a 35 mm twin-screw extruder was pelletized by using a granulator to obtain a material for the insulating inner layer and a material for the insulating outer layer.

(3) By using the obtained materials for the insulating inner layer and the insulating outer layer, two-layer coextrusion using a 40 mm extruder was performed so that the thicknesses of the inner and outer layers immediately above the tin plated conductor are as shown in Table 1 to coat the conductor 11 with the insulating inner layer 12a and coat the insulating inner layer 12a with the insulating outer layer 12b.

(4) The obtained insulating wire was irradiated with electron ray to perform the cross-linking treatment. An irradiation amount is as shown in Table 1.

A thermogravimetric mass loss (TG) of the obtained insulating wire was measured by using the following method. The measurement results are shown in Table 1.

The obtained insulating outer layer 12b of the insulating wire was heated from 40° C. at a temperature increase rate of 10° C./min under purge gas of dried air in the thermogravimetric analysis method. The TG obtained when the temperature reaches 430° C. is desirably −60% or more.

The obtained insulating wire was evaluated by various evaluation tests as described below. The evaluation results are shown in Table 1.

(1) Flame Resistance Test

An insulating wire having a length of 600 mm was vertically held, and the insulating wire was flamed for sixty seconds. An insulating wire which was extinguished within sixty seconds after the flame is removed was evaluated as "passed" (o), and an insulating wire which was not extinguished within sixty seconds was evaluated as "failed" (x).

(2) Wear Test

In compliance with EN 50305.5.2, the wear resistance was evaluated. An insulating wire whose wear resistance cycle is equal to or more than 150 was evaluated as "passed" (o), and an insulating wire whose wear resistance cycle is less than 150 was evaluated as "failed" (x). Noted that an insulating wire whose wear resistance cycle exceeds 300 was not further evaluated.

(3) Electrical Test

In compliance with EN 50305.6.7, a 300-V direct-current stability test was performed. An insulating wire which was not short-circuited for 240 hours was evaluated as "passed" (o), an insulating wire which was short-circuited within hours equal to or more than 100 hours and less than 240 hours was evaluated as "passed" (Δ), and an insulating wire which was short-circuited within hours less than 100 hours was evaluated as "failed" (x).

(4) Comprehensive Evaluation

As a comprehensive evaluation, an insulating wire for which ail of the above-described test evaluations are "o" was evaluated as "passed" (⊚), an insulating wire with the evaluation including "Δ" was evaluated as "passed" (o), and an insulating wire with the evaluation including "x" was evaluated as "failed" (x).

TABLE 1

EXAMPLES AND COMPARATIVE EXAMPLES (UNIT OF COMPOSITION AMOUNT IS "PARTS BY MASS")

| ITEM | EXAMPLE | 1 | 2 | 3 | 4 | 5 | 6 | 7 | 8 | 9 | 10 | COMP 1 | COMP 2 |
|---|---|---|---|---|---|---|---|---|---|---|---|---|---|
| INSULATING OUTER LAYER | PBT [1] | 50 | 50 | | 50 | 50 | 50 | 50 | 50 | 50 | 50 | 50 | 50 |
| | PBT ELASTOMER [2] | | 50 | | | | | | | | | | |
| | PBN [3] | 50 | | 50 | | | | | | | | | |
| | MODIFIED PPE [4] | | | 50 | | | | | | | | | |
| | SILICONE MODIFIED POLYETHER-IMDE [5] | | | | 50 | 50 | 50 | 50 | 50 | 50 | 50 | 50 | 50 |
| | MAGNESIUM HYDROXIDE [6] | 10 | 10 | 10 | 10 | 5 | 50 | 10 | 10 | 10 | 10 | 10 | 10 |
| INSULATING INNER LAYER | LLDPE [7] | 100 | 100 | 100 | 100 | 100 | 100 | 100 | 100 | 100 | 100 | 100 | 100 |
| | MAGNESIUM HYDROXIDE [6] | 80 | 80 | 80 | 80 | 80 | 80 | 20 | 100 | 80 | 80 | 80 | 80 |
| INSULATING LAYER STRUCTURE | OUTER LAYER THICKNESSES a (mm) | 0.16 | 0.16 | 0.16 | 0.16 | 0.16 | 0.16 | 0.16 | 0.16 | 0.19 | 0.11 | 0.21 | 0.06 |
| | INNER LAYER THICKNESS b (mm) | 0.1 | 0.1 | 0.1 | 0.1 | 0.1 | 0.1 | 0.1 | 0.1 | 0.07 | 0.15 | 0.05 | 0.2 |
| | INNER LAYER RATIO b/(a + b) (%) | 39 | 39 | 39 | 39 | 39 | 39 | 39 | 39 | 27 | 58 | 19 | 77 |
| ELECTRON RAY IRRADIATION AMOUNT (Mrad) | | 15 | 15 | 15 | 15 | 15 | 15 | 15 | 15 | 15 | 15 | 15 | 15 |
| THERMOGRAVIMETRIC MASS LOSS OF INSULATING OUTER LAYER (TG) (%) | | −60 ◯ | −52 ◯ | −20 ◯ | −50 ◯ | −55 ◯ | −45 ◯ | −50 ◯ | −50 ◯ | −50 ◯ | −50 ◯ | −50 ◯ | −50 ◯ |
| EVALUATION | FLAME RESISTANCE TEST | ◯ | ◯ | ◯ | ◯ | ◯ | ◯ | ◯ | ◯ | ◯ | ◯ | ◯ | ◯ |
| | WEAR TEST JUDGMENT AS TO NUMBER OF CYCLES | >300 ◯ | >300 ◯ | >300 ◯ | >300 ◯ | >300 ◯ | >300 ◯ | >300 ◯ | >300 ◯ | >300 ◯ | 160 ◯ | >300 ◯ | 100 X |
| | DIRECT-CURRENT STABILITY TEST: JUDGMENT AS TO SHORT-CIRCUIT TIME (h) | 240 ◯ | 240 ◯ | 240 ◯ | 240 ◯ | 240 ◯ | 240 ◯ | 240 ◯ | 120 Δ | 100 Δ | 240 ◯ | 50 X | 240 ◯ |
| | COMPREHENSIVE EVALUATION | ⊚ | ⊚ | ⊚ | ⊚ | ⊚ | ⊚ | ⊚ | ◯ | ◯ | ⊚ | X | X |

[1] (POLYBUTYLENE TEREPHTHALATE) MANUFACTURED BY MITSUBISHI ENGINEERING-PLASTIC CORPORATION, NOVADURAN 5026
[2] (POLYBUTYLENE ELASTOMER) MANUFACTURED BY DU PONT-TORAY CO. LTD, HYTREL 4777
[3] (POLYBUTYLENE NAPHTHALATE) MANUFACTURED BY TEIJIN CHEMICALS LTD, TQB-OT
[4] (MODIFIED POLYPHENYLENE ETHER) MANUFACTURED BY SABIC CORPORATION, WCV-063-111
[5] MANUFACTURED BY SABIC CORPORATION, STM1500
[6] MANUFACTURED BY ALBEMARLE CORPORATION, MAGNIFIN H10A
[7] (LINEAR LOW-DENSITY POLYETHYLENE) MANUFACTURED BY JAPAN POLYETHYLENE CORPORATION, NOVATEC UF420

As shown in Table 1, all evaluations were "o" in first to seventh and tenth examples, and therefore, their comprehensive evaluations were "passed" (⊚). Also, in eighth and ninth examples, the electrical characteristics were "Δ", and therefore, their comprehensive evaluations were "passed" (o).

As shown in Table 1, in the first comparative example, the thickness of the insulating inner layer was small, and the electrical characteristics were failed, and therefore, its comprehensive evaluation was "failed" (x).

As shown in Table 1, in the second comparative example, the material thickness of the insulating outer layer was small, and the wear resistance was failed, and therefore, its comprehensive evaluation was "failed" (x).

What is claimed is:

1. A non-halogen multilayer insulating wire comprising:
   a conductor; and
   an insulating layer having an insulating inner layer which covers an outer circumference of the conductor and an insulating outer layer which covers an outer circumference of the insulating inner layer,
   wherein the insulating inner layer is made of a first non-halogen resin composition which contains metal hydroxide and a base polymer (A) including polyolefin, and has a thickness of 20% to 58% of an entire thickness of the insulating layer, the insulating outer layer is made of a second non-halogen resin composition which contains metal hydroxide and a base polymer (B) including polyester resin and/or polyester elastomer resin, the base polymer (B) includes a resin having an aromatic structure in a main chain, and the resin having the aromatic structure in the main chain is one or more selected from polyether imide, silicone modified polyether imide, polyphenylene ether, modified polyphenylene ether, and polyether ether ketone.

2. The non-halogen multilayer insulating wire according to claim 1,
wherein the polyester resin is polybutylene terephthalate (PBT) and/or polybutylene naphthalate (PBN).

3. The non-halogen multilayer insulating wire according to claim 1,
wherein the polyester elastomer resin is polybutylene elastomer.

4. The non-halogen multilayer insulating wire according to claim 1,
wherein the first non-halogen resin composition contains 20 to 100 parts by mass of the metal hydroxide with respect to 100 parts by mass of the base polymer (A).

5. The non-halogen multilayer insulating wire according to claim 1,
wherein the second non-halogen resin composition contains 5 to 50 parts by mass of the metal hydroxide with respect to 100 parts by mass of the base polymer (B).

6. The non-halogen multilayer insulating wire according to claim 1,
wherein the metal hydroxide contained in the first and/or second non-halogen resin composition is magnesium hydroxide.

7. A non-halogen multilayer insulating wire comprising:
a conductor; and
an insulating layer having an insulating inner layer which covers an outer circumference of the conductor and an insulating outer layer which covers an outer circumference of the insulating inner layer,
wherein the insulating inner layer is made of a first non-halogen resin composition which contains metal hydroxide and a base polymer (A) including polyolefin, and has a thickness of 20% to 58% of an entire thickness of the insulating layer,
the insulating outer layer is made of a second non-halogen resin composition which contains metal hydroxide and a base polymer (B) including polyester resin and/or polyester elastomer resin,
the base polymer (B) includes a resin having an aromatic structure in a main chain, and
the resin having the aromatic structure in the main chain is polyether imide and/or silicone modified polyether imide.

8. The non-halogen multilayer insulating wire according to claim 7,
wherein the polyester resin is polybutylene terephthalate (PBT) and/or polybutylene naphthalate (PBN).

9. The non-halogen multilayer insulating wire according to claim 7,
wherein the polyester elastomer resin is polybutylene elastomer.

10. The non-halogen multilayer insulating wire according to claim 7,
wherein the first non-halogen resin composition contains 20 to 100 parts by mass of the metal hydroxide with respect to 100 parts by mass of the base polymer (A).

11. The non-halogen multilayer insulating wire according to claim 7,
wherein the second non-halogen resin composition contains 5 to 50 parts by mass of the metal hydroxide with respect to 100 parts by mass of the base polymer (B).

12. The non-halogen multilayer insulating wire according to claim 7,
wherein the metal hydroxide contained in the first and/or second non-halogen resin composition is magnesium hydroxide.

13. A non-halogen multilayer insulating wire comprising:
a conductor; and
an insulating layer having an insulating inner layer which covers an outer circumference of the conductor and an insulating outer layer which covers an outer circumference of the insulating inner layer,
wherein the insulating inner layer is made of a first non-halogen resin composition which contains metal hydroxide and a base polymer (A) including polyolefin, and has a thickness of 20% to 58% of an entire thickness of the insulating layer,
the insulating outer layer is made of a second non-halogen resin composition which contains metal hydroxide and a base polymer (B) including polyester resin and/or polyester elastomer resin, and
the second non-halogen resin composition has a thermogravimetric mass loss (TG) of −60% or more when heated from 40° C. to reach 430° C. at a temperature increase rate of 10° C./min under purge gas of dried air in a thermogravimetric analysis method.

14. The non-halogen multilayer insulating wire according to claim 13,
wherein the polyester resin is polybutylene terephthalate (PBT) and/or polybutylene naphthalate (PBN).

15. The non-halogen multilayer insulating wire according to claim 13,
wherein the polyester elastomer resin is polybutylene elastomer.

16. The non-halogen multilayer insulating wire according to claim 13,
wherein the first non-halogen resin composition contains 20 to 100 parts by mass of the metal hydroxide with respect to 100 parts by mass of the base polymer (A).

17. The non-halogen multilayer insulating wire according to claim 13,
wherein the second non-halogen resin composition contains 5 to 50 parts by mass of the metal hydroxide with respect to 100 parts by mass of the base polymer (B).

18. The non-halogen multilayer insulating wire according to claim 13,
wherein the metal hydroxide contained in the first and/or second non-halogen resin composition is magnesium hydroxide.

* * * * *